(12) United States Patent
Suhre et al.

(10) Patent No.: US 6,508,233 B1
(45) Date of Patent: Jan. 21, 2003

(54) METHOD FOR CONTROLLING A FUEL SYSTEM OF A MULTIPLE INJECTION SYSTEM

(75) Inventors: Blake R. Suhre, Neenah, WI (US); Jeffery C. Ehlers, Neenah, WI (US); Robert E. Haddad, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 61 days.

(21) Appl. No.: 09/825,709

(22) Filed: Apr. 4, 2001

(51) Int. Cl.⁷ .............................................. F02M 51/00
(52) U.S. Cl. ........................ 123/478; 123/472; 123/299
(58) Field of Search ................................ 123/478, 472, 123/492, 559.1, 299

(56) References Cited

U.S. PATENT DOCUMENTS

| | | | |
|---|---|---|---|
| 4,146,006 A | 3/1979 | Garabedian | 123/198 |
| 4,461,149 A | 7/1984 | Suzuki | 60/602 |
| 4,530,339 A | 7/1985 | Oguma | 123/561 |
| 4,637,210 A | 1/1987 | Yamamoto | 60/602 |
| 5,052,360 A * | 10/1991 | Ingle | 123/430 |
| 5,127,386 A | 7/1992 | Sowards | 123/564 |
| 5,231,962 A | 8/1993 | Osuka et al. | 123/299 |
| 5,492,098 A | 2/1996 | Hafner et al. | 123/446 |
| 5,778,858 A | 7/1998 | Garabedian | 123/481 |
| 5,797,370 A * | 8/1998 | Kimura et al. | 123/478 |
| 5,806,473 A * | 9/1998 | Kometani et al. | 123/299 |
| 5,806,483 A * | 9/1998 | Mitarai et al. | 123/143 B |
| 5,848,582 A | 12/1998 | Ehlers et al. | 123/486 |
| 5,890,459 A * | 4/1999 | Hedrick et al. | 123/27 GE |
| 5,924,403 A | 7/1999 | Thomas | 123/300 |
| 5,937,832 A | 8/1999 | Kapich | 123/561 |
| 5,937,833 A | 8/1999 | Kapich | 123/561 |
| 5,970,954 A * | 10/1999 | Worth et al. | 123/478 |
| 6,032,642 A | 3/2000 | Trumbower et al. | 123/299 |
| 6,298,830 B1 * | 10/2001 | Kono | 123/478 |
| 6,354,277 B1 * | 3/2002 | Kato | 123/357 |

* cited by examiner

*Primary Examiner*—John Kwon
(74) *Attorney, Agent, or Firm*—William D. Lanyi

(57) ABSTRACT

A method for controlling a fuel system of a multiple injector engine provides a primary fuel injector and a secondary fuel injector which are both connected in fluid communication with an air stream flowing to a combustion chamber of the engine. Based on the total magnitude of fuel required to be injected into the air stream and as a function of the engine speed and percent load of the engine, first and second shares of the total magnitude of fuel are determined for the primary and secondary fuel injectors. The primary and secondary fuel injectors are then caused to inject their respective shares of the total fuel magnitude into the air stream, with the primary and secondary shares being determined as a function of engine speed and percent load of the engine.

13 Claims, 4 Drawing Sheets

METHOD FOR CONTROLLING A FUEL SYSTEM OF A MULTIPLE INJECTION SYSTEM

BACKGROUND OF THE INVENTION

1. Field of the Invention

The present invention is generally related to a supercharging system for an engine and, more particularly, to a supercharged system having two superchargers which each provide a share of the fuel based on engine speed and the load on the engine.

2. Description of the Prior Art

Many different types of supercharger systems are known to those skilled in the art. U.S. Pat. No. 5,937,833, which issued to Kapich on Aug. 17, 1999, describes a control system for a hydraulic supercharger system. The control system is specially adapted to control a supercharger system comprising a hydraulic pump, a supercharger having a hydraulic turbine drive and a compressor driven by the hydraulic turbine drive, a main hydraulic piping means providing a hydraulic circulation loop for hydraulic fluid to flow from the pump to drive the hydraulic turbine drive and back to the pump, and a supercharger bypass system comprising a control bypass valve and a piping means to permit a portion of the hydraulic fluid to bypass the supercharger turbine drive. The control system includes a bypass control valve arranged to close and partially and fully open the controlled bypass valve. The bypass control valve may be a hydraulic valve controlled by the pressure of the compressed air intake to the engine. The bypass control valve may also be a solenoid valve controlled by a pressure switch connected to sense hydraulic pressure and to apply a voltage to the solenoid valve to open or close the valve upon the hydraulic pressure reaching a predetermined value.

U.S. Pat. No. 5,937,832, which issued to Kapich on Aug. 17, 1999, is generally similar to U.S. Pat. No. 5,937,833 which is described above. The control system includes a solenoid arranged to close and partially or fully open the control bypass valve. The solenoid may be controlled by a pressure switch connected to sense hydraulic sense and to apply a voltage to the solenoid to open or close the valve upon the hydraulic pressure reaching a predetermined value. Since the hydraulic pressure increases with engine speed, it is a simple matter to adjust the control system to provide for the hydraulic fluid to drive the supercharger or bypass the supercharger at any predetermined ranges of engine speed. The bypass valve may also be controlled based on engine throttle position. In another preferred embodiment where the turbocharger system comprises an air flow check valve which opens when a turbocharger is providing air to the engine, the bypass valve is also subject to control based on the position on the check valve so that the hydraulic supercharger can be substantially bypassed when the turbocharger is able to provide sufficient air to the engine.

U.S. Pat. No. 5,127,386, which issued to Sowards on Jul. 7, 1992, describes an apparatus for controlling a supercharger. The apparatus includes a compressor having a rotor portion, an inlet, and a discharge. A motor portion of the apparatus has an intake manifold connected to the discharge. A throttle is displaceable between an open and closed position for controlling fluid flow between the discharge and the intake manifold. A bypass return line connects the rotor portion of the compressor to the inlet. A piston valve, moveable between an open location and a closed location, controls flow through the bypass return line. A control line, connecting the intake manifold to the piston rod controls the location of the piston valve. A control valve may be included to control fluid flow through the control line. A computer, which is affected by the operation of the motor, controls the position of the control valve.

U.S. Pat. No. 4,637,210, which issued to Yamamoto on Jan. 20, 1987, describes a supercharge pressure control apparatus of a supercharged engine. A bypass is provided to bypass a supercharger turbine arranged between the intake and exhaust passages. A waste gate valve is attached at one end of the bypass and is coupled to an actuator having a pressure chamber communicated with a connecting passage which is branched at a branch point into the first and second passages. A first port is formed in the intake passage downstream near a suction inlet of a compressor and a second port is formed in the intake passage downstream of the first port. In the stationary operating state, the connecting passage is communicated with the second passage by the charge-over valve, so that a high pressure from the second port acts on the pressure chamber and the supercharged pressure is maintained at a set level. In the acceleration operating state, the connecting passage is communicated with the first passage for a predetermined time, so that a low pressure from the first port acts on the pressure chamber. When the pressure at the first port operates the set level, the pressure at the second port exceeds the set level, so that a supercharged pressure over the set level is supplied into the engine. After a preset time, the connecting passage is communicated with the second passage and the pressure is held at the set level.

U.S. Pat. No. 4,530,339, which issued to Oguma et al on Jul. 23, 1985, describes a supercharger control apparatus for motor vehicles. The apparatus comprises a control device which has as input signals the demand signal for acceleration and an engine rotation speed signal. Based on predetermined ranges of demand signal for acceleration and engine rotational speed and on the input signals, the control device regulates, through an actuator and bypass valve or through an actuator and variable capacity compressor, the amount of supercharging. The supercharge control apparatus allows a non-supercharged state, a maximum supercharged state, or an intermediate supercharged state. In the intermediate supercharged state, the amount of supercharging is in incremental steps to prevent hunting.

U.S. Pat. No. 4,461,149, which issued to Suzuki on Jul. 24, 1984, describes a turbocharger control system for an internal combustion engine. The system comprises a supercharger for applying a supercharge pressure to the engine by driving a compressor with a turbine rotated by the energy of the exhaust gas, and an exhaust gas bypass valve for regulating the amount of the exhaust gas supplied to the turbine. A factor related to the engine combustion state, such as a knocking condition, is detected and a signal representing the condition is generated. At least one output pressure produced from the compressor is modified in accordance with the above-mentioned signal. The pressure thus modified is used for adjusting the opening of the exhaust gas bypass valve thereby to control the supercharge pressure.

U.S. Pat. No. 5,848,582, which issued to Ehlers et al on Dec. 15, 1998, discloses an internal combustion engine with barometric pressure related start of air compensation for a fuel injector. The control system for a fuel injector system for an internal combustion engine is provided with a method by which the magnitude of the start of air point for the injector system is modified according to the barometric pressure measured in a region surrounding the engine. This offset, or modification, of the start of air point adjusts the timing of the fuel injector system to suit different altitudes at which the engine may be operating.

U.S. Pat. No. 6,032,642, which issued to Trumbower et al on Mar. 7, 2000, describes a method for enhanced split injection in internal combustion engines. It describes a method for controlling fuel delivery in a fuel injection system capable of performing a split injection and includes the step of comparing at least one engine operating temperature to a temperature threshold and disabling split injection when the engine operating temperature exceeds the temperature threshold. Disabling split injection in this manner enhances cold temperature engine operating while providing a single injection at higher operating temperatures, as desired. Further, an engine and a computer readable storage medium having information stored thereon representing the instructions executable by an engine controller for comparing at least one engine operating temperature to a temperature threshold are also described. The computer readable storage medium instructions disable split injection when the engine operating temperature exceeds the temperature threshold.

U.S. Pat. No. 5,924,403, which issued to Thomas on Jul. 20, 1999, describes a method for enhanced split injection in internal combustion engines. It describes a method for controlling a compression-ignition internal combustion engine which provides a delivery of multiple fuel injection pulses per cylinder firing with precision of pulse quantities, separation, and timing adequate for transition between split and single injection at any speed and load, without disturbing the primary engine governor. The method compensates for variable operating conditions such as supply voltage, injection pressure, injection pulse separation, and injector actuation latency or rise-time.

U.S. Pat. No. 5,778,858, which issued to Garabedian on Jul. 14, 1998, describes a fuel injection split engine. An automobile includes an engine and an engine controller. The engine includes multiple cylinders. Each cylinder has a fuel injector connected to the engine controller. The engine controller has a first output which activates a first fraction of the fuel injectors. In addition, the engine controller has a second output which activates a second fraction of the fuel injectors. The engine controller also has an input which provides a timing signal synchronous with rotation of the engine and sequencing circuit responsive to the timing signal. The sequencing circuit periodically alternates between the first and second output in synchronization with the rotation of the engine.

U.S. Pat. No. 5,492,098, which issued to Hafner et al on Feb. 20, 1996, describes an apparatus for variably controlling the fuel flow characteristics of a hydraulically actuated injector during an injection cycle. The apparatus includes variable control of actuating fluid pressure and a spill control apparatus associated with the plunger and barrel assembly of the injector. The apparatus can control the initial rate of fuel injection and also provide continuous or split injection throughout the load and speed range of an engine. Performance is controlled by the geometry of the spill control apparatus along with the variably controlled pressure of the actuating fluid supplied to the injector. The apparatus helps reduce engine noise and emissions.

U.S. Pat. No. 5,231,962, which issued to Osuka et al on Aug. 3, 1993, describes a fuel injection control system with split fuel injection for a diesel engine. At startup, a fuel injection control system for the diesel engine injects a pre-jet of fuel into a combustion chamber in synchronism with a signal indicative of an angular position of the crankshaft of the diesel engine. After the pre-jet of fuel has been injected, the fuel injection control system injects a main jet of fuel which is larger in quantity than the injected pre-jet of fuel. Even when the engine rotational speed is low and subjected to variations as at engine startup, the pre-jet of fuel is reliably injected into the combustion chamber at a desired time. The prejet of fuel which is injected and ignited prior to the main jet develops an easily ignitable, activated condition in the combustion chamber. The subsequently injected main jet of fuel can thus be easily ignited by the activated condition in the combustion chamber. The diesel engine can be started quickly and smoothly without fail.

U.S. Pat. No. 4,146,006, which issued to Garabedian on Mar. 27, 1979, describes a fuel injection split engine. A circuit is described for a multiple cylinder engine which permits operation of all of the engine cylinders or part thereof in response to engine loads. Different operating modes, incorporating different number of cylinders, are activated in a fuel injection engine in response to varying power demands. Manual switching circuits on the dashboard of the automobile permit the driver to override the automatic system and require that the engine operate in any of its operating modes. When operating in partial modes, a circuit automatically rotates the cylinder banks which are operated to assure uniform engine wear and cooling. Switches are provided on the dashboard to permit the operator to selectively skip certain engine modes in the automatic, load-responsive sequencing of engine operation.

The patents described above are hereby expressly incorporated by reference in the description of the present invention.

It would be significantly beneficial, in view of the supercharger systems known to those skilled in the art, to provide a control method for a supercharged engine in which the air charge mass provided to the combustion chambers of the engine is controlled as a function of charge air temperature, charge air pressure, and barometric pressure.

SUMMARY OF THE INVENTION

A method for controlling a supercharger, made in accordance with the present invention, comprises the steps of disposing the supercharger in fluid communication within an air stream flowing to a combustion chamber of a cylinder of an engine, selecting a desired magnitude of air per cylinder (APC) to be provided to the combustion chamber of the engine, measuring an actual pressure of charge air provided to the cylinder of the engine, measuring an actual temperature of charge air provided to the cylinder of the engine, providing a throttle valve disposed upstream from the supercharger and the combustion chamber for controlling the amount of air flowing to the inlet of the supercharger, through the supercharger, to the combustion chamber, providing a bypass conduit connecting the outlet of the supercharger to the inlet of the supercharger, and providing a bypass valve within the bypass conduit to control the flow of air from the outlet of the supercharger to the inlet of the supercharger through the bypass conduit.

The method of the present invention further comprises the steps of calculating an actual magnitude of air charge mass provided to the combustion chamber as a function of the actual charge air temperature and the actual charge air pressure, determining a difference between the actual magnitude of charge air and the desired magnitude of charge air, and controlling the position of the bypass valve as a function of the difference between the actual magnitude of charge air and the desired magnitude of charge air.

The method of the present invention can further comprise the steps of measuring an actual barometric pressure of the air surrounding the engine and calculating a ratio of the actual charge air pressure to the actual barometric pressure (i.e. "MAP/BARO"). It further comprises the steps of calculating an actual magnitude of air charge mass provided to the combustion chamber as a function of the actual charge air pressure, the ratio (i.e. "MAP/BARO"), and the actual charge air temperature.

Certain embodiments of the present invention measure the actual pressure at a location in fluid communication with the charge air between the outlet of the supercharger and the combustion chamber. The actual charge air temperature can be measured at a location in fluid communication with the charge air between the outlet of the supercharger and the combustion chamber. A preferred embodiment of the present invention further comprises the step of providing a microprocessor connected in signal communication with the temperature sensor for measuring the actual charge air temperature of air provided to the cylinder and a pressure sensor for measuring an actual charge air pressure (i.e. "MAP") provided to the cylinder, wherein the microprocessor performs the calculating and determining steps. The calculating step can calculate the air per cylinder (APC) for the one or more cylinders according to a relationship which defines the air per cylinder as being equal to the manifold absolute pressure (MAP) multiplied by the swept volume of the cylinder and also multiplied by the volumetric efficiency (i.e. $\eta$) with that product being divided by the product of the ideal gas constant R multiplied by the charge air temperature measured within the air intake manifold. The engine can be a powerhead of a marine propulsion system, such as an outboard motor.

BRIEF DESCRIPTION OF THE DRAWINGS

The present invention will be more fully and completely understood from a is reading of the description of the preferred embodiment in conjunction with the drawings, in which.

DESCRIPTION OF THE PREFERRED EMBODIMENT

Figure 1:
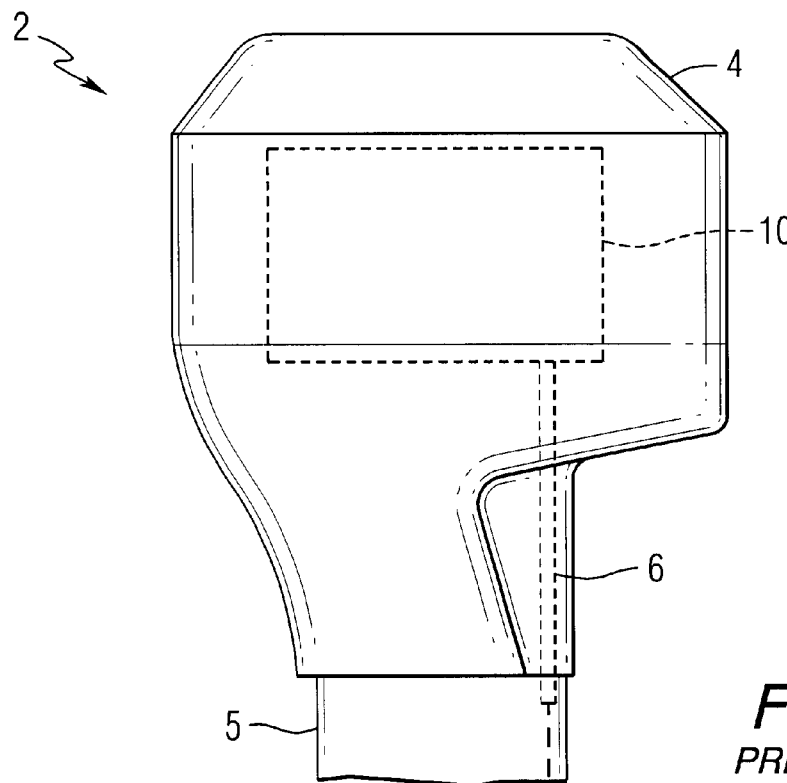
FIG. 1 is a side view of an outboard motor known to those skilled in the art.

Throughout the description of the preferred embodiment of the present invention, like components will be identified by like reference numerals.

FIG. 1 shows the typical structure of a known outboard motor 2 in which a cowl 4 is disposed around an engine 10. An output driveshaft 6 of the engine 10 extends downward from the engine 10, through a driveshaft housing 5, and in torque transfer relation with a propeller 7. The torque transfer relationship is represented schematically by dashed lines 8 and 9 in FIG. 1. In certain types of engine 10, a supercharger can provide charged air under pressure to the combustion chambers within the cylinders of the engine 10.

Although the present invention will be described in greater detail below in conjunction with a single cylinder, it should be understood that the principles of the present invention are intended for use with engines having one or more cylinders.

Figure 2:
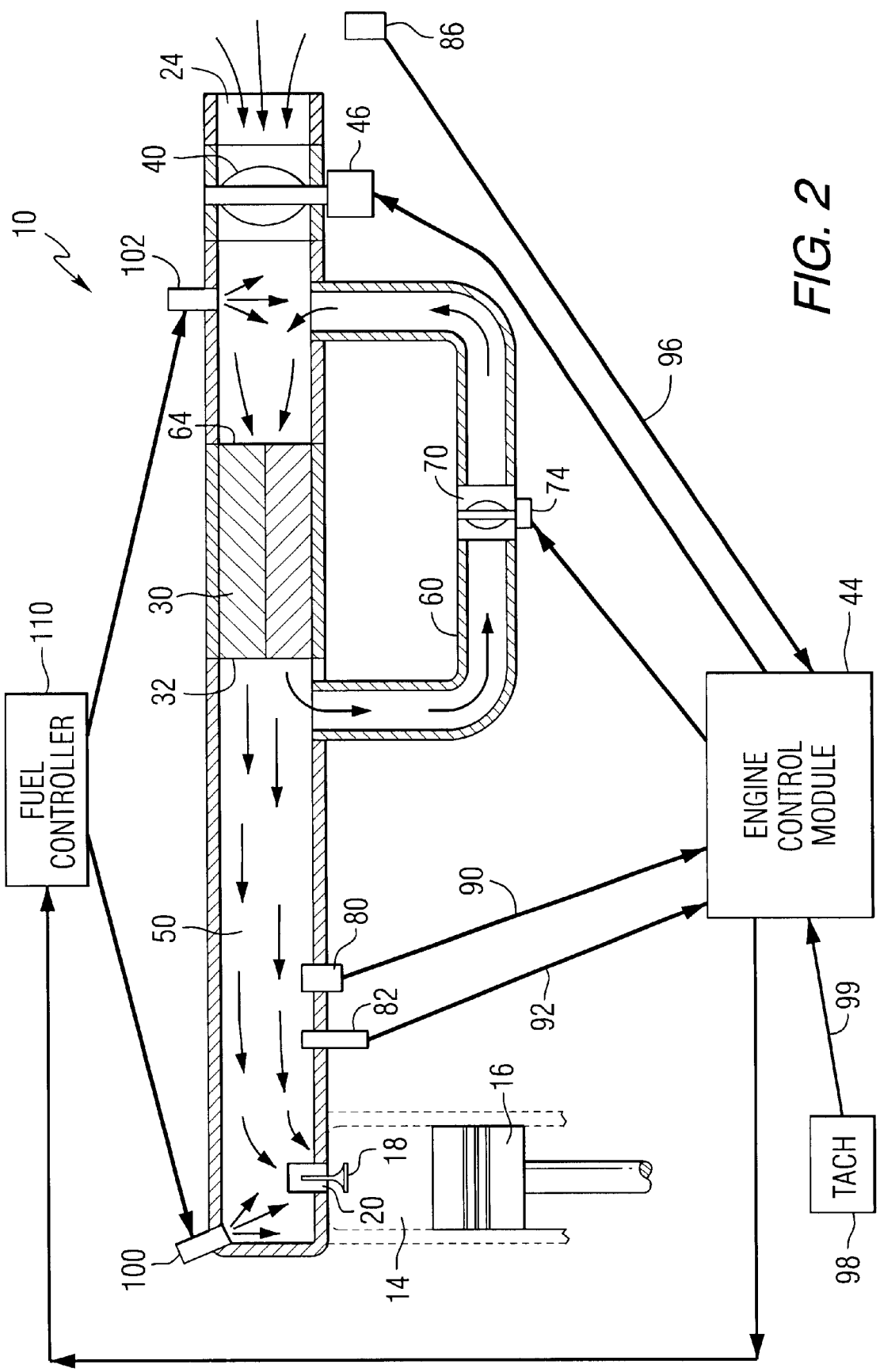
FIG. 2 is a schematic sectional view of the present invention.

FIG. 2 shows certain portions of an engine 10 in conjunction with the components used to perform the process of the present invention. Represented by dashed lines in FIG. 2, a cylinder 14 is shaped to receive a piston 16 in sliding relation therein. A valve 18 is moveable within an opening 20 to allow a fuel/air mixture to enter the combustion chamber above the piston 16 and within the cylinder 14.

Air is drawn into the system at an inlet 24 of an air intake manifold and pressurized by a compressor 30 which produces pressurized charge air at an outlet 32 of the compressor 30. This air passes through a throttle valve 40, which is a butterfly valve in one embodiment of the present invention. The throttle valve 40 is controlled by an engine control module (ECM) 44 that provides signals to an actuator 46 which can comprise a stepper motor, but it should be understood that other types of actuators 46 can be used. The throttle valve 40 controls the flow of air through the portion of the intake manifold 50 downstream from the throttle valve 40.

With continued reference to FIG. 2, a bypass conduit 60 connects the outlet 32 of the compressor 30 with the inlet 64 of the compressor 30. A bypass valve 70 controls the flow of air through the bypass conduit 60 and is controlled by the engine control module (ECM) 44. The engine control module 44 provides control signals to an actuator 74 which manipulates the position of the valve 70, which can be a butterfly valve. As can be seen in FIG. 2, the pressures at the outlet 32 of the compressor 30 and the region of the intake manifold 50 downstream from the supercharger are determined as a combined function of the positions of the throttle valve 40 and the bypass valve 70.

The engine control module 44 is provided with signals from a pressure sensor 80 and a temperature sensor 82. In addition, another pressure sensor 86 is provided to measure the barometric pressure in the region surrounding the engine 10. The engine control module 44 receives the actual manifold absolute pressure, measured by the pressure sensor 80, on line 90, the actual charge air temperature measured by the temperature sensor 82, on line 92, and the barometric pressure (BARO) measured by the pressure sensor 86, on line 96.

In FIG. 2, the supercharger 30 is disposed in fluid communication within the air stream flowing through an intake manifold to a combustion chamber of a cylinder 14 of an engine 10. As will be described in greater detail below, the engine control module 44 selects a desired magnitude of charge air, such as an air per cylinder per cycle magnitude (APC) to be provided to the combustion chamber of the engine 10. The engine control module 44 then measures an actual pressure on line 90 and an actual temperature on line 92 relating to the air charge mass provided to the cylinder 14. The throttle valve 40 is disposed upstream from the supercharger 30 and the combustion chamber of the cylinder 14 for controlling the amount of air flowing to the supercharger 30 and to the combustion chamber. A bypass conduit 60 is connected between the inlet 64 of the supercharger and the outlet 32 of the supercharger and a bypass valve 70 is disposed within the bypass conduit 60 to control the flow of air from the outlet 32 of the supercharger 30 to the inlet 64 of the supercharger 30 through the bypass conduit 60. The engine control module calculates an actual magnitude of air provided to the combustion chamber as a function of the actual temperature on line 92 and the actual pressure on line 90 and determines a difference between the actual magnitude of air and the desired magnitude of air. Based on this difference, the engine control module (ECM) 44 controls the position of the bypass valve 70. If the actual magnitude of charge air is greater than the desired magnitude of charged air, the engine control module 44 opens the bypass valve 70 to allow a greater amount of air to flow around the compressor 30 in a reverse direction back to its inlet 64. If the actual magnitude of charged air is less than the desired magnitude of charged air, the engine control module 44 closes the bypass valve 70 by a preselected amount to cause more of the compressed air to flow through the throttle valve 40 to the cylinder 14. The actual air per cylinder per cycle (APC) of the engine is calculated by the engine control module 44 as a function of the measured actual pressure on line 90, the measured actual temperature on line 92, and the barometric pressure on line 96. More specifically, the microprocessor of the engine control module 44 calculates the air per cylinder per cycle according to the relation shown below.

$$APC=(MAP)(\text{Volume})(\text{Volumetric Efficiency})/(R)(\text{Temperature}) \quad (1)$$

In equation 1, shown above, "MAP" represents the manifold absolute pressure measured by the pressure sensor 80 and provided on line 90 to the engine control module 44. The cylinder swept volume is a predetermined magnitude that represents the total volume of the cylinder 14 swept by the piston 16. The volumetric efficiency is determined as a function of the engine speed and a ratio (i.e. "MAP/BARO") between the manifold absolute pressure (MAP) and the barometric pressure (BARO) measured on line 96. The engine speed can be measured by the engine control module directly or, alternatively, by a tachometer 98. If measured by an external device, such as the tachometer 98, the speed is then provided to the engine control module 44 on line 99, as shown in FIG. 2.

Figure 3:
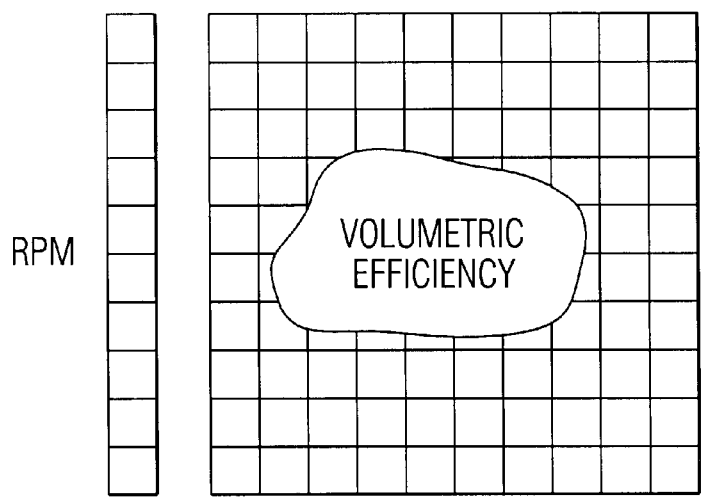
FIG. 3 is an illustration of a ten by ten array containing volumetric efficiency values as a function of engine speed and the MAP/BARO ratio.

FIG. 3 represents a two dimensional array that can be stored within a memory of a microprocessor of an engine control module 44. The array can be a ten-by-ten array in which each of the entries represent a volumetric efficiency (η) for a particular combination of engine speed and the ratio between manifold absolute pressure and barometric pressure. The one hundred element array in FIG. 3 is representative of this type of stored two dimensional array in which each of the entries is a volumetric efficiency empirically or theoretically determined prior to operation of the engine and selected by the microprocessor of the engine control module 44 as a function of the engine speed (i.e. RPM) and the ratio between the manifold absolute pressure and barometric pressure (i.e. "MAP/BARO"). The numerator of equation 1 is then divided by R, which is the ideal gas constant, and the inlet air temperature measured on line 92 by the temperature sensor 82.

Since equation 1 is a function of all of the pertinent ambient conditions, it implicitly compensates for changes in those ambient conditions, such as temperature, barometric pressure, and actual pressure within the air intake manifold 50. Since the air per cylinder per cycle (APC) is the most direct measure of load in a homogeneously charged engine, such as the one described above in conjunction with FIG. 2, the methodology of the present invention controls the bypass valve 70 according to the most appropriate parameter relevant to a pressure charged engine.

With continued reference to FIG. 2, a primary fuel injector 100 and a secondary fuel injector 102 are provided to inject fuel into the air stream flowing from the inlet 24 of the intake system to the combustion chamber of the cylinder 14. The primary fuel injector 100 is positioned to direct a spray of fuel vapor toward the intake valve 18. The secondary injector 102 is intended to spray fuel into the air stream at a position upstream from the inlet 64 of the compressor 30. The fuel sprayed into the air stream by the secondary fuel injector 102 not only provides fuel that will eventually be combusted within the cylinder 14, but also provides fuel that can cool the compressor 30. During operation of the engine 10, the engine control module 44 provides a total fuel magnitude value (FPC) to a fuel controller 110. The total fuel magnitude is determined by any of the known methods used in conjunction with fuel injected engines. The present invention is not directly related to the specific technique used to determine the total fuel magnitude value provided by the engine control module 44 to the fuel controller 100. However, when two or more fuel injectors are used in a fuel injected system, the present invention provides an efficient way to distribute the fuel commands by the fuel controller 110 to the primary and secondary fuel injectors, 100 and 102, respectively.

Figure 4:
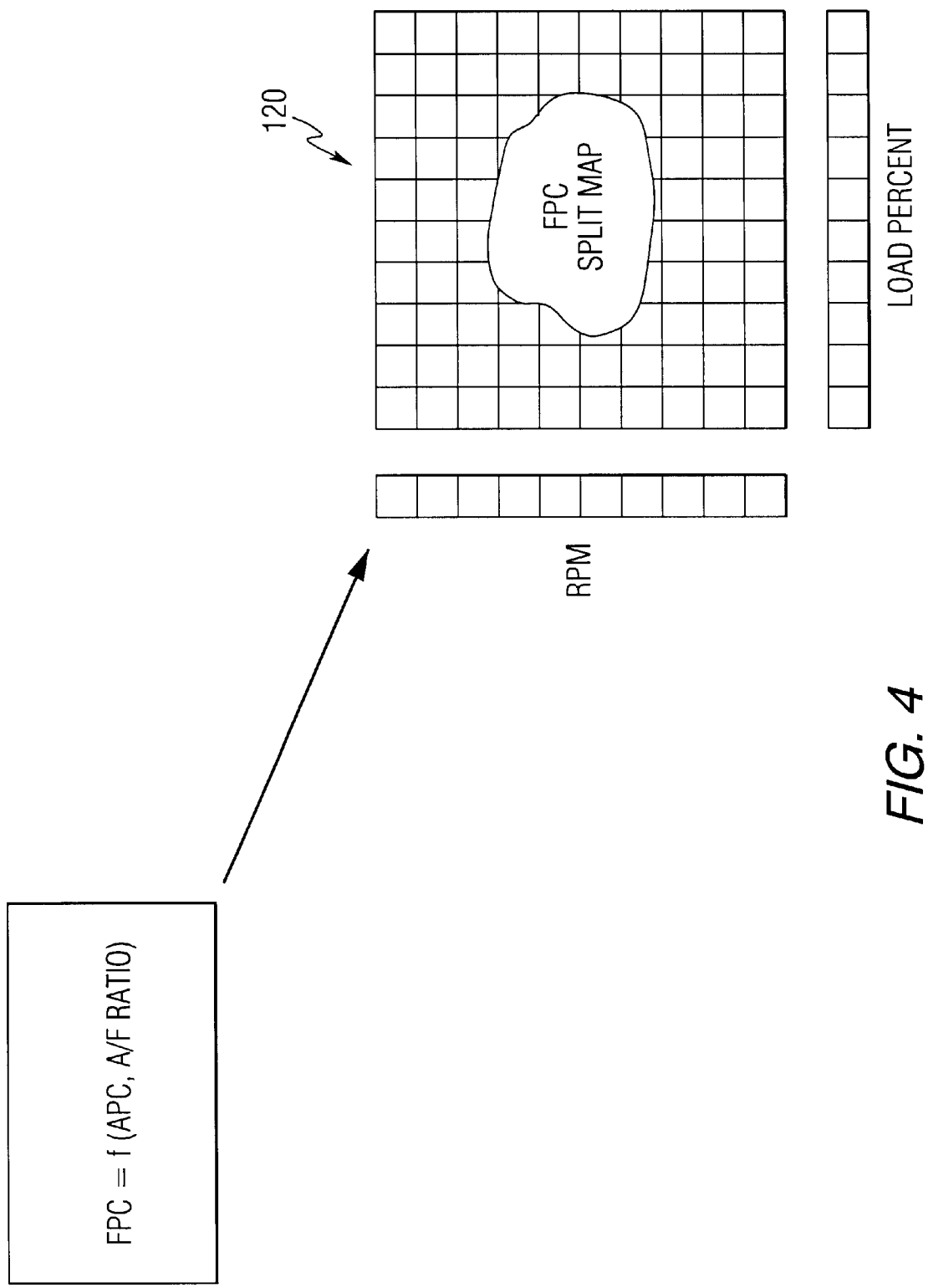
FIG. 4 is a schematic representation of the method in which a total fuel per cylinder (FPC) is used in combination with a FPC split map.

After calculating the total fuel per cycle (FPC) in a manner generally known to those skilled in the art, as described in U.S. Pat. No. 5,848,582, the present invention uses a two dimensional array to store one hundred fuel per cycle split values as a function of engine speed (i.e. "RPM") and percent of load (i.e. "LOAD PERCENT"). Depending on the type of engine with which the present invention is used, the percent of load (i.e. "LOAD PERCENT") can be determined as a function of the fuel per cycle (FPC) in a stratified charge engine or the air per cylinder per cycle (APC) in a homogeneously charged engine. If the control system used in conjunction with the engine is a torque based system, as disclosed in U.S. application Ser. No. 09/422,614 which was filed on Oct. 21, 1999 by Suhre and assigned to the assignee of the present application, the fuel per cycle (FPC) is determined as a function of engine speed and torque demand. However, it should be understood that the initial determination of the total fuel per cylinder (FPC) is not limiting to the present invention. After the total fuel per cylinder value (FPC) is determined, the fuel per cylinder split map 120 is used to select the percentage of the total fuel per cylinder that will be injected by the primary injector 100 as shown in FIG. 4. The remainder of the total fuel per cylinder (FPC) will be injected by the secondary fuel injector 102. For example, if the engine speed and percent load indicate a magnitude of 0.70 as selected from the appropriate entry of the ten-by-ten array 120, 70% of the total fuel per cylinder (FPC) will be injected by the primary injector 100 and the other 30% of the total fuel per cylinder (FPC) will be injected by the secondary injector 102.

In a typical application of the present invention, the FPC split map 120 shown in FIG. 4 will likely provide magnitudes of 1.00 for the entries in the ten-by-ten array representing a low engine speed and a low load percent (i.e. bottom left corner of array 120). The magnitudes stored in the array 120 would represent gradually lower values for increasing engine speed and increasing load percent. In other words, at maximum engine speed and maximum load percent, at the upper right portion of the FPC split map 120, the empirically determined entries would typically be in the 0.20 to 0.50 range. This would represent a situation in which the primary injector 100 is providing between 20% and 50% of the total fuel per cycle (FPC) and the secondary injector 102 is providing the remainder of the fuel. It should be understood that the maximum output capability of the primary fuel injector 100 affects the entries in the FPC split map 120 because, at high engine speeds and high percent loads, 50% of the total fuel per cylinder (FPC) may hypothetically be the maximum output of the primary fuel injector 100. As the engine speed and the load per cent increase, the total fuel per cylinder (FPC) also increases. The values stored in the ten-by-ten array 120 represent the "share" of the total fuel per cylinder (FPC) provided by each of the two fuel injectors, 100 and 102 and not the actual amount of fuel.

Figure 5:
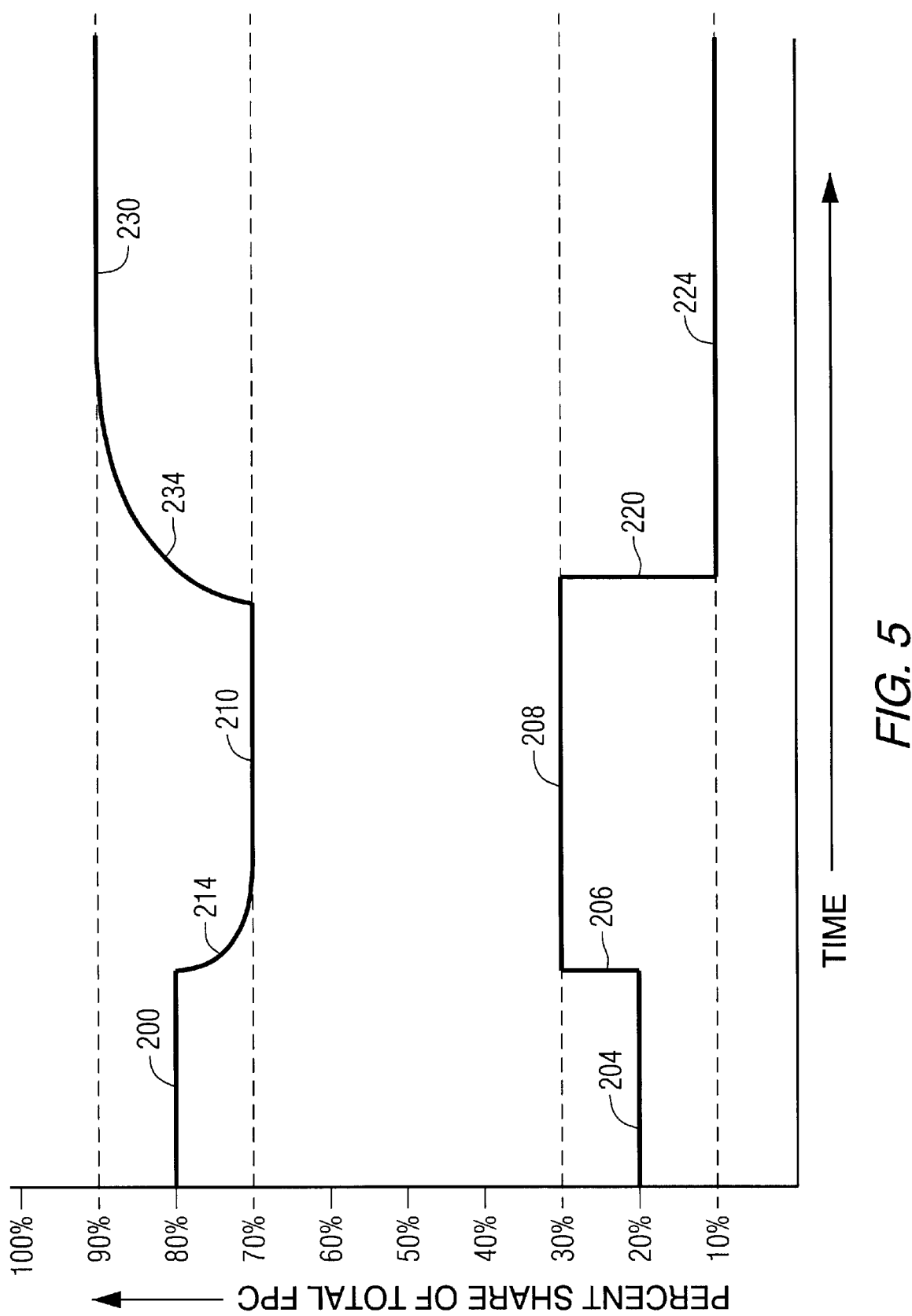
FIG. 5 is a graphical representation of how the primary and secondary shares of the total magnitude of fuel per cylinder (FPC) are changed.

FIG. 5 illustrates a theoretical time-based graphical representation of how the shares of the total magnitude of the fuel per cylinder (FPC) is dynamically changed for the primary and secondary fuel injectors in one adaptation of the present invention. Beginning at the left portion of the graph of FIG. 5, the hypothetical primary fuel injector 100 (downstream) share of the total fuel per cylinder (FPC) is represented by line 200 and is equivalent to 80% of the total fuel per cylinder. The share of the total fuel per cylinder injected from the secondary fuel injector 102 (upstream) is represented by line 204 in FIG. 5. It is shown as a 20% share. At some time during the operation of the engine, the secondary fuel injector's share is changed from 20% to 30%, as represented by step 206 and line 208 and the primary fuel injector's share of the total fuel per cylinder injected through the primary fuel injector is correspondingly changed from 80% to 70%, as represented by line 210. However, the change in the primary fuel injector's share is not a step function but, instead, is a ramp 214 as shown. Similarly, at a later time when the secondary fuel injector is decreased in share from 30% to 10%, as represented by step 220 in line 224, the primary fuel injector's share is changed from 70% to 90%, as represented by line 230, in a ramped change as represented by line 234. Although certain embodiments of the present invention can employ step change functions for both the primary 100 and secondary 102 fuel injectors, a preferred embodiment changes the primary fuel injector's share of fuel injected by the primary fuel injector in a ramped method as represented by line segments 214 and 234 in FIG. 5.

Although the present invention has been described in particular detail and illustrated to show a preferred embodiment, it should be understood that alternative embodiments are also within its scope.

We claim:

1. A method for controlling a fuel system of a multiple injector engine, comprising s the steps of:

providing a primary fuel injector in fluid communication with an air stream flowing to a combustion chamber of said engine for injecting fuel into said air stream;

providing a secondary fuel injector in fluid communication with said air stream flowing to a combustion chamber of said engine for injecting fuel into said air stream;

determining a magnitude of total fuel per cylinder to be injected into said air stream;

measuring a speed of said engine;

determining a percent load of said engine;

selecting a first share of said magnitude of total fuel per cylinder to be injected into said air stream by said primary fuel injector and a second share of said magnitude of total fuel per cylinder to be injected into said air stream by said secondary fuel injector, both as a combined function of both said speed of said engine and said percent load of said engine;

causing said primary fuel injector to inject said first share of said magnitude of total fuel per cylinder to be injected into said air stream; and causing said secondary fuel injector to inject said second share of said magnitude of total fuel per cylinder to be injected into said air stream, said magnitude of total fuel per cylinder to be injected into said air stream being equal to the sum of said first and second shares.

2. The method of claim 1, further comprising:

providing a supercharger in fluid communication with said combustion chamber.

3. The method of claim 2, wherein:

said primary fuel injector is disposed in fluid communication with said air stream between said supercharger and said combustion chamber.

4. The method of claim 2, wherein:

said supercharger is disposed in fluid communication with said air stream between said primary and secondary fuel injectors.

5. The method of claim 1, wherein:

said first share is selected from a two dimensional array of first share values.

6. The method of claim 1, wherein:

said second share is calculated as the difference between unity and said first share.

7. A method for controlling a fuel system of a multiple injector engine, comprising the steps of:

providing a primary fuel injector in fluid communication with an air stream flowing to a combustion chamber of said engine for injecting fuel into said air stream;

providing a secondary fuel injector in fluid communication with said air stream flowing to a combustion chamber of said engine for injecting fuel into said air stream;

determining a magnitude of total fuel per cylinder to be injected into said air stream;

measuring a speed of said engine;

determining a percent load of said engine;

selecting a first share of said magnitude of total fuel per cylinder to be injected into said air stream by said primary fuel injector and a second share of said magnitude of total fuel per cylinder to be injected into said air stream by said secondary fuel injector, both as a combined function of both said speed of said engine and said percent load of said engine;

providing a supercharger in fluid communication with said combustion chamber, said primary fuel injector is disposed in fluid communication with said air stream between said supercharger and said combustion chamber;

causing said primary fuel injector to inject said first share of said magnitude of total fuel per cylinder to be injected into said air stream; and causing said secondary fuel injector to inject said second share of said magnitude of total fuel per cylinder to be injected into said air stream, said magnitude of total fuel per cylinder to be injected into said air stream being equal to the sum of said first and second shares.

8. The method of claim 7, wherein:

said supercharger is disposed in fluid communication with said air stream between said primary and secondary fuel injectors.

9. The method of claim 8, wherein:

said first share is selected from a two dimensional array of first share values.

10. The method of claim 9, wherein:

said second share is calculated as the difference between unity and said first share.

11. A method for controlling a fuel system of a multiple injector engine, comprising the steps of:

provrding a primary fuel injector in fluid communication with an air stream flowing to a combustion chamber of said engine for injecting fuel into said air stream;

providing a secondary fuel injector in fluid communication with said air stream flowing to a combustion chamber of said engine for injecting fuel into said air stream;

determining a magnitude of total fuel per cylinder to be injected into said air stream;

measuring a speed of said engine;

determining a percent load of said engine;

selecting a first share of said magnitude of total fuel per cylinder to be injected into said air stream by said primary fuel injector and a second share of said magnitude of total fuel per cylinder to be injected into said air stream by said secondary fuel injector, both as a combined function of both said speed of said engine and said percent load of said engine, said second share being calculated as the difference between unity and said first share;

providing a supercharger in fluid communication with said combustion chamber, said primary fuel injector is disposed in fluid communication with said air stream between said supercharger and said combustion chamber;

causing said primary fuel injector to inject said first share of said magnitude of total fuel per cylinder to be injected into said air stream; and causing said secondary fuel injector to inject said second share of said magnitude of total fuel per cylinder to be injected into said air stream, said magnitude of total fuel per cylinder to be injected into said air stream being equal to the sum of said first and second shares.

12. The method of claim 11, wherein:

said supercharger is disposed in fluid communication with said air stream between said primary and secondary fuel injectors.

13. The method of claim 12, wherein:

said first share is selected from a two dimensional array of first share values.

* * * * *